United States Patent
Werra

[11] 3,775,832
[45] Dec. 4, 1973

[54] METHOD OF MANUFACTURING SHROUDED GASKETS

[75] Inventor: Bruno H. Werra, Waukesha, Wis.

[73] Assignee: Ladish Co., Cudahy, Wis.

[22] Filed: Nov. 1, 1971

[21] Appl. No.: 194,250

Related U.S. Application Data

[62] Division of Ser. No. 83,042, Oct. 22, 1970, abandoned.

[52] U.S. Cl.................. 29/450, 29/453, 277/231, 277/228
[51] Int. Cl............................................ B23p 11/02
[58] Field of Search........................... 29/450, 453; 277/231, 228

[56] References Cited
UNITED STATES PATENTS

| | | | |
|---|---|---|---|
| 2,580,546 | 1/1952 | Hobson | 277/231 X |
| 2,859,061 | 4/1958 | Reid | 29/453 UX |
| 3,212,798 | 10/1965 | Lewis et al. | 277/228 X |

Primary Examiner—Charlie T. Moon
Attorney—Arthur L. Morsell, Jr. et al.

[57] ABSTRACT

The gasket comprises a sheath of firm, relatively tough and non-stretchable fluoroplastic material having a circular peripheral slot machined into its periphery and having machined externally-projecting ribs, and a flat, ring-shaped elastomeric core which is stretched into position for insertion in said slot of the sheath.

2 Claims, 5 Drawing Figures

PATENTED DEC 4 1973

3,775,832

3,775,832

METHOD OF MANUFACTURING SHROUDED GASKETS

This application is a division of application Ser. No. 83,042, filed Oct. 22, 1970, now abandoned.

BACKGROUND OF THE INVENTION

1. Field of the Invention

The present invention pertains to gaskets which are particularly useful in equipment employed in the chemical, pharmaceutical, cosmetic and food industries.

2. Description of the Prior Art

Heretofore it has been attempted to employ solid gaskets of a fluoroplastic such as tetrafluoroethylene (TFE) but it has been found that the material cold-flows and sets, with resulting leaks developing, so that it has been necessary to continuously tighten up such gaskets. TFE is, however, because of its chemical inertness and resistance to high temperatures, highly desirable for uses where the gasket is subject to the action of chemicals and to high temperature conditions. Heretofore attempts to provide a satisfactory gasket for such uses utilizing a material of the type of TFE have not been successful.

SUMMARY OF THE INVENTION

The present invention provides a new gasket and method of manufacturing the same wherein a firm, relatively tough and non-stretchable fluoroplastic such as TFE has a machined peripheral slot, and wherein a core is formed of a flat, ring-shaped, elastomeric material which is stretched into position in the slot of the sheath to provide sufficient elastomeric properties so that it maintains the shape of the outer sheath, keeping the latter from cold flowing.

A further object of the invention is to provide an improved gasket comprising a relatively tough, fluoroplastic sheath and an elastomeric core, wherein the sheath has machined, externally-projecting, ring-shaped ribs for coaction with grooves in the flanges of a pipe joint.

A further object of the invention is to provide an improved gasket which is unaffected by most acids, bases or solvents and has useful physical properties at cryogenic temperatures, under conditions of continuous use up to 550° F., and is at the same time, resistant to cold flow.

A further object of the invention is to provide a new method of manufacturing a gasket.

A further object of the invention is to provide a gasket which is particularly suitable for use in equipment which is employed in the chemical, pharmaceutical, food and cosmetic fields.

With the above and other objects in view, the invention consists of the shrouded gasket and method of manufacturing the same, and all of its parts, combinations, and steps, as set forth in the claims, and all equivalents thereof.

BRIEF DESCRIPTION OF THE DRAWINGS

In the accompanying drawings, illustrating two preferred embodiments of the invention.

DESCRIPTION OF THE PREFERRED EMBODIMENT

Figure 1:
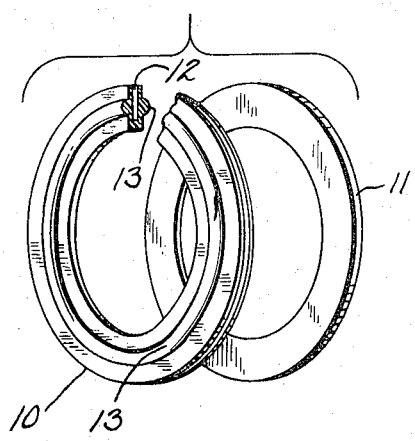
FIG. 1 is a perspective view showing the two components of the improved gasket before assembly, part of the sheath being broken away and shown in section.

Referring more particularly to the drawing, the improved gasket includes a ring-shaped sheath 10 and a ring-shaped core 11. The sheath is formed of a fluoroplastic such as tetrafluoroethylene (TFE). It may also be formed of chlorotrifluoroethylene (CTFE), or fluorinated ethylenepropylene (FEP). TFE is, however, preferred as it has very high heat and chemical resistance (up to 550° F.), has excellent resistance to heat aging, and zero moisture absorption. One brand of TFE which is suitable is commonly sold under the trademark "Teflon."

Inasmuch as the fluoroplastics to be used for the sheath have the disadvantage of cold flowing and have no elastomeric qualities, it is a feature of the present invention to combine with such sheath an elastomeric core material which will provide elasticity to the entire gasket and render the gasket suitable for universal use for all conditions up to 550° F. Accordingly, the core 11 is a flat ring of elastomeric material. This may be any of various synthetic materials having sufficient elastic properties and resistance to heat. There are various synthetic elastomers which are suitable. The preferred one is a fluoro-elastomer such as a co-polymer of vinylidene fluoride-hexafluoropropylene, or vinylidene fluoridehexafluoropropylene-tetrafluoroethylene co-polymers, one type of which is marketed under the trademark "Viton." Other useful elastomers include ethylene-propylene copolymers or terpolymers, one brand of which is marketed as "Nordel," and a copolymer of acrylonitrile-butadiene, commonly termed Buna N. These elastomers have little plastic flow but have the ability to make a quick and complete recovery from an extending force. The above-mentioned preferred elastomer has higher resistance to temperatures and greater resistance to chemicals than some of the others. This is desirable in case there should be any breakdown in the sheath material, as it enables the core material to also resist high temperatures and chemical action.

Figure 4:
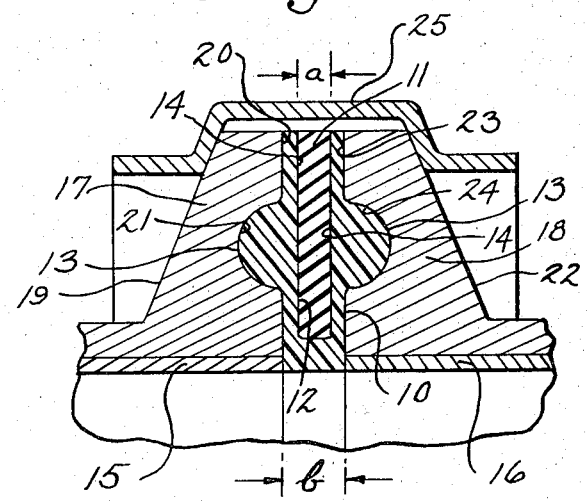
FIG. 4 is an enlarged fragmentary axial sectional view of a pipe joint showing the improved gasket used in said joint, with the parts in clamped and sealing condition.

In manufacturing the improved gasket the fluoroplastic sheath is first molded to the general form shown in FIG. 1 and then it is machined, preferably with a lathe, to provide the required ID and OD and the required thickness, and, in the form of gasket illustrated, where there are circular ribs 13 projecting from the outer side of the sheath, these ribs are machined in at the same time. Then a circular slot 12 is cut into the periphery to extend a substantial distance therein as shown in FIGS. 1 and 4, the slot, however, terminating short of the inner periphery of the gasket. The slot is cut to provide plain, flat sides 14. The slot has a transverse width (a) of FIG. 4 which is preferably 0.047 of an inch where the main thickness of the gasket at (b) FIG. 4 is 0.089 of an inch. This will vary somewhat depending upon the particular materials selected for the sheath and the core, the thickness of the core being somewhere between 40 percent and 60 percent of the thickness of the sheath proper. This, however, is not a critical dimension, it being a matter of experimentation with the particular materials. There must be enough thickness in the elastomer to impart the desired elasticity to the sheath. On the other hand, the walls of the fluoroplastic sheath cannot be reduced to a point where they might fracture. Furthermore, there must be enough wall thickness in the sheath to furnish proper support while the slot 12 is being cut. In the preferred embodiment each rib is on a radius which is approximately equal to the thickness of the core material, but this is not a critical dimension.

After the sheath has been completed, the flat, straight-sided core 11 is prepared to ring form, as shown in FIG. 1. It is then stretched to a point that its ID can be inserted in the slot 12 at the OD of the sheath. The core material is then released and allowed to fill the slot 12 of the sheath in the manner shown in FIGS. 2-5, inclusive, the core material having a radial width equal to the depth of the slot 12.

Figure 2:
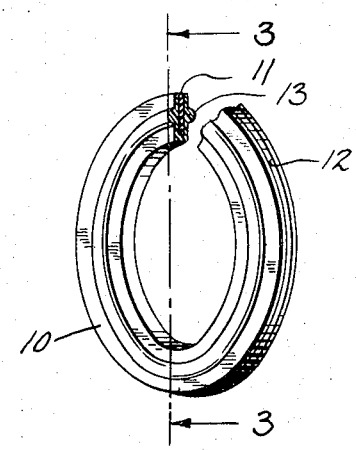
FIG. 2 is a perspective view showing the improved gasket after the core has been inserted, part being broken away and shown in section.
Figure 3:
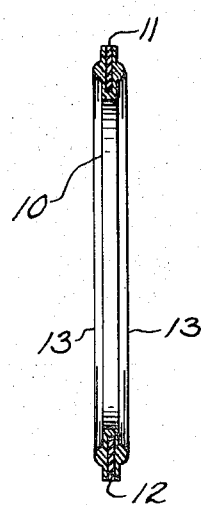
FIG. 3 is a cross-sectional view through the improved gasket in assembled condition.
Figure 5:
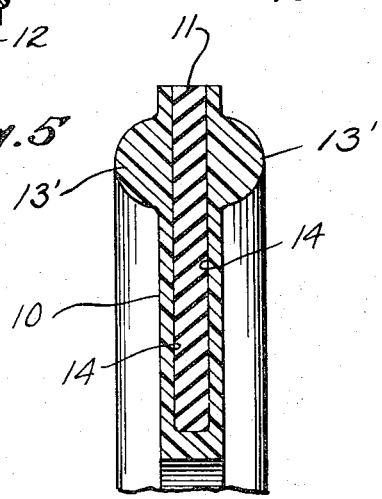
FIG. 5 is an enlarged fragmentary sectional view showing a slightly modified form of shrouded gasket.

While the ribs 13 are shown in FIGS. 1, 2 and 3 as being midway of the radial width of the gasket, the ribs may be positioned in other locations as shown by the ribs 13' in FIG. 5.

The improved gasket is particularly adapted for use in a joint of the type illustrated in FIG. 4. Here there are metal pipe ends 15 and 16 which are to be connected. These pipe ends have end fittings to provide annular flanges 17 and 18. The flange 17 has an annular taper 19 on one side and a straight face 20 on the opposite side provided with an annular groove 21. Flange 18 has a tapered side 22 and an opposite side 23 which is straight and which is provided with an annular groove 24. The gasket of FIG. 3 fits between the faces 20 and 23 of the flanges, and the ribs 13 of the gasket are received in the grooves 21 and 24, as shown in FIG. 4. Any suitable means, such as a split clamping ring 25, is usually employed to coact with the tapered faces 19 and 22 of the flanges in drawing the flanges together into sealing relationship with opposite sides of the gasket.

While the improved shrouded gasket is preferably formed with the annular ribs 13, the features of the present invention would obviously have usefulness in ribless gaskets wherein the outer faces 20 and 23 are flat.

With the features of the present invention the relatively thick core of elastomer 11 prevents the material of the sheath from losing its shape when it is compressed in a joint such as the joint of FIG. 4. This is due to the elastomeric qualities of the core 11 which prevent cold flow of the material of the outer sheath. Thus all of the advantages of the fluoroplastic, such as resistance to heat and chemical action, are obtained while eliminating the usual disadvantage of its cold flow characteristics and lack of elasticity. By having the core formed of the preferred material such as vinylidenefluoride-hexafluoropropylene, the core material, while having the desired elastomeric qualities, also has higher resistance to temperature and chemical actions than other elastomeric materials such as natural rubber. The particular gasket is therefore suitable for use in equipment which is employed in food processing industries, in the chemical industry, in the cosmetic industry, and in the pharmaceutical industry.

It is to be understood that I do not desire to be limited to the exact details of construction shown and described, for obvious modifications will occur to a person skilled in the art.

I claim:

1. A method of manufacturing a shrouded gasket comprising producing a ring-shaped sheath having a radial dimension substantially greater than its thickness and formed of a firm, relatively tough and non-stretchable fluoroplastic material; cutting an annular slot which is a thin rectangle in cross-section into the outer periphery of the sheath and terminating the cut substantially short of the internal diameter of the sheath to leave spaced side portions connected by a substantial body of material, such spaced side portions having outer marginal portions spaced from each other by the thickness of the cut slot; forming a flat, ring-shaped core of elastomeric material of the same size and shape as the cut slot to completely fill the radial depth of the slot; and inserting the core material into the slot with the spaced side portions of the sheath maintained in their original relationship after such insertion, and with the outer peripheral portion of the core therebetween and holding the outer marginal portions of the spaced sides in substantially the same relationship as they were after the cutting of the slot.

2. A method of manufacturing a shrouded gasket as claimed in claim 1 which includes the step of machining the outer sides of the sheath to provide circular outwardly-projecting ribs on the spaced side portions of the sheath which are located on opposite sides of the core.

* * * * *